Patented Sept. 11, 1951

2,567,905

UNITED STATES PATENT OFFICE 2,567,905

FUNGI AND BACTERIA RESISTANT POLYVINYL CHLORIDE COMPOSITIONS

Walter E. Field, St. Louis, Mo., assignor to Monsanto Chemical Company, St. Louis, Mo., a corporation of Delaware No Drawing. Application December 6, 1948, Serial No. 63,857

10 Claims. (Cl. 260—30.2)

This invention relates to improved resinous compositions containing polymerized vinyl chloride. More particularly, this invention relates to plasticized resinous compositions having improved resistance to deterioration due to attack by such micro-organisms as fungi and bacteria, and containing polymerized vinyl chloride, copolymers containing predominantly combined vinyl chloride, or combinations thereof containing predominantly combined vinyl chloride, collectively and broadly herein referred to as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings. In such applications, polyvinyl chloride compositions have found utility as a free or unsupported film but more frequently polyvinyl chloride compositions have been used to coat such textiles as cotton, wool, silk, rayon, and nylon thereby obtaining a composition or fabric for use in the above mentioned applications which combines the desirable properties of the textile and the desirable properties of the polyvinyl chloride composition. Such polyvinyl chloride compositions frequently contain plasticizers or stabilizers which have their origin in animal or vegetable sources, or the base material of coated compositions frequently contains materials which have their origin in animal or vegetable sources which thereby render the resultant composition quite susceptible to deteriorating attack by such micro-organisms as fungi and bacteria. Such deterioration of polyvinyl chloride compositions or polyvinyl chloride coated compositions seriously hinders full scale utility of the compositions particularly in those areas and those applications which are conducive to such an attack.

Copper 8-quinolinolate is a well known fungicide and bactericide, and repeated attempts have been made to incorporate this material into polyvinyl chloride compositions in order to render such compositions resistant to attacks by fungi and bacteria. It has been found, however, that copper 8-quinolinolate is exceedingly incompatible with polyvinyl chloride compositions. According to the methods as heretofore practiced, if even minor amounts, of the order of 0.2% by weight of total composition, are incorporated into a plasticized polyvinyl chloride composition, within several hours after preparation of the composition the copper 8-quinolinolate begins to crystallize or bloom on the surface of the composition indicating incompatibility and rendering the composition unfit for use.

It is an object of this invention to provide polyvinyl chloride compositions having improved resistance to deterioration due to attack by such micro-organisms as fungi and bacteria.

It is also an object of this invention to provide a plasticized polyvinyl chloride composition wherein there may be incorporated a sufficient quantity of copper 8-quinolinolate to render the composition resistant to attack by fungi and bacteria and in which composition the copper 8-quinolinolate is fully compatible evidencing no tendency to bloom or crystallize in the composition.

It is a further object of this invention to provide a textile coated with a plasticized polyvinyl chloride composition which is resistant to deterioration due to attack by fungi and bacteria.

Further objects will become apparent from the description of the novel compositions of this invention and the claims.

In order to obtain fungi or bacteria resistant polyvinyl chloride compositions, it is desired that such compositions contain from 0.1 to 2.5 parts by weight of copper 8-quinolinolate per hundred parts of polymerized vinyl chloride resin. It has now been found that such quantities of copper 8-quinolinolate may be incorporated into a polyvinyl chloride composition without blooming or crystallization resulting if there is also incorporated therein from 5 to 50 parts by weight and preferably 10 to 30 parts by weight of an N-alkyl arylsulfonamide of the formula

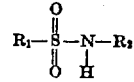

wherein $R_1$ is phenyl or tolyl radical and $R_2$ is an alkyl radical containing at least 1 and not more than 8 carbon atoms. Thus, the novel fungicidal and bactericidal polyvinyl chloride compositions of this invention are comprised of 100 parts by weight of a polymerized vinyl chloride resin, 5 to 100 parts by weight of a plasticizer, 0.1 to 2.5 parts by weight of copper 8-quinolinolate, and 5 to 50 parts by weight and preferably 10 to 30 parts by weight of a compound selected from the group consisting of N-alkyl benzenesulfonamides and N-alkyl toluenesulfonamides wherein the alkyl group contains at least 1 and not more than 8 carbon atoms.

Typical of the N-alkyl arylsulfonamides which may be utilized in the novel composition of this invention are the following:

N-methyl benzenesulfonamide
N-ethyl benzenesulfonamide
N-isopropyl benzenesulfonamide
N-butyl benzenesulfonamide
N-isobutyl benzenesulfonamide
N-tert. butyl benzenesulfonamide
N-hexyl benzenesulfonamide
N-capryl benzenesulfonamide
N-6-methylheptyl benzenesulfonamide
N-2-ethylhexyl benzenesulfonamide
N-methyl o-toluenesulfonamide
N-ethyl p-toluenesulfonamide
N-isopropyl m-toluenesulfonamide
N-butyl o-toluenesulfonamide
N-tert. butyl p-toluenesulfonamide
N-iso-butyl p-toluenesulfonamide
N-hexyl o-toluenesulfonamide
N-capryl p-toluenesulfonamide
N-6-methylheptyl p-toluenesulfonamide
N-2-ethylhexyl p-toluenesulfonamide Though particular reference has been made to compositions of polymerized vinyl chloride resins, the herein described N-alkyl benzenesulfonamides and N-alkyl toluenesulfonamides and copper 8-quinolinolate may be incorporated into compositions containing resins that are formed through the conjoint polymerization of mixtures of monomers that are predominantly vinyl chloride, such as mixtures of predominantly vinyl chloride and varying amounts of vinyl esters of carboxylic acids. These copolymers containing predominantly combined vinyl chloride are exemplified by copolymers containing 95% to 80% by weight of combined vinyl chloride and 5 to 20% by weight of combined vinyl acetate, vinyl fluoride, vinylidene chloride, diethyl maleate or methyl methacrylate.

The compositions of this invention may also contain carbon black, zinc oxide, clay, wood flour, and other pigments, stabilizers, and fillers commonly used in the plastics industry. The compatibilizing effect of the N-alkyl benzenesulfonamides and N-alkyl toluenesulfonamides of this invention on copper 8-quinolinolate is also realized in unplasticized compositions as well as compositions plasticized with the common plasticizers used in the plastics industry such as dioctyl phthalate, dibutyl phthalate, dinonyl phthalate, tricresyl phosphate, trioctyl phosphate, dibutyl sebacate, dioctyl adipate, butyl phthalyl, butyl glycolate, and resinous plasticizers such as the condensation products of polycarboxylic acids and polyhydric alcohols.

The novel compositions of this invention may be effectively utilized to produce free or unsupported polyvinyl chloride films and sheeting which will be resistant to the deteriorating effects of fungi and bacteria. These compatible compositions may also be applied as a coating to various textiles, such as, cotton, wool, rayon, silk, and nylon, and synthetic and artificial leathers. These compositions may be so applied by any of the well known methods used to apply polyvinyl chloride coatings, such as the conventional calendering, solvent coating, or dip coating methods. Such coated compositions, wherein the novel compositions of this invention are utilized, in addition to possessing the desirable characteristics of the base material and the polyvinyl chloride coating, are thereby rendered extremely resistant to deterioration due to attack by fungi and bacteria.

All of the compositions of the following examples were processed in the following identical manner in order to evaluate the utility of the N-alkyl benzenesulfonamides and N-alkyl toluenesulfonamides of this invention as compatibilizing agents for copper 8-quinolinolate in polyvinyl chloride compositions. This processing procedure is described as follows:

The proportional parts by weight of the resins, plasticizers, compatibilizing agent and copper 8-quinolinolate were weighed and intimately mixed, and the mixture placed on a differential speed roll mill and further mixed and fluxed for 5 minutes at 160° C. At the end of this roll and mixing operation, homogeneous compositions had formed on the roll mill and the plasticized polyvinyl chloride compositions were then sheeted off of the roll mill. Specimens of each composition were then placed in a mold 5" x 5" x 0.040" and subjected to a pressure of 2,000 lbs. per square inch, and a temperature of 160° C. The molded specimens, after removal from the mold, were observed for compatibility. Those compositions which exhibited signs of blooming or crystallization on the surface of the molded specimen were regarded as incompatible and unfit for use. Those specimens which evidenced no sign of crystallization or blooming, were regarded as compatible and suitable for use.

Example I

A composition comprising 100 parts of polyvinyl chloride, 2.5 parts tricresyl phosphate, 2.5 parts of butyl acetyl ricinoleate, and 1 part of copper 8-quinolinolate was processed in the above described manner. The specimen, when removed from the mold, evidenced crystallization on the surface of the composition, thereby indicating incompatibility of the copper 8-quinolinolate.

Example II

A composition comprising 100 parts of polyvinyl chloride, 2.5 parts of tricresyl phosphate, 2.5 parts of butyl acetyl ricinoleate, 10 parts of N-methyl benzenesulfonamide and 1 part of copper 8-quinolinolate was processed in the above described manner. The specimen when removed from the mold was free of any signs of blooming or crystallization, thereby indicating a compatible composition.

Example III

A composition comprising 100 parts of polyvinyl chloride, 25 parts of tricresyl phosphate, 25 parts of butyl acetyl ricinoleate, and 0.2 part of copper 8-quinolinolate was processed in the above described manner. The molded specimen exhibited blooming and a crystal formation on the surface thereby indicating that copper 8-quinolinolate was incompatible in this composition.

Example IV

A composition comprising 100 parts of polyvinyl chloride, 25 parts of tricresyl phosphate, 25 parts of butyl acetyl ricinoleate, 5 parts of N-6-methylheptyl benzenesulfonamide and 0.2 part of copper 8-quinolinolate was prepared in the above described manner. The specimen exhibited no signs of incompatibility.

Example V

A composition was prepared containing 100 parts of polyvinyl chloride, 25 parts of tricresyl phosphate, 25 parts of butyl acetyl ricinoleate, 25 parts of N-ethyl p-toluenesulfonamide, and 1 part of copper 8-quinolinolate and was processed in the manner described above. The molded specimen evidenced no signs of incompatibility.

A cotton duck fabric was coated with the composition described in Example V by the calendering method which consisted in simultaneously passing the fabric and the polyvinyl chloride composition through a conventional three roller calender. The coated cotton duck fabric, in addition to possessing the desirable characteristics of the fabric and the polyvinyl chloride coating, was extremely resistant to attack by fungi and bacteria by virtue of the composition having incorporated therein copper 8-quinolinolate.

Example VI

A composition comprising 100 parts of polyvinyl chloride, 25 parts of dioctyl phthalate, and 2.5 parts of copper 8-quinolinolate was prepared in the manner described above. The molded specimen exhibited blooming and crystallization on the surface indicating the incompatibility of copper 8-quinolinolate in this composition.

Example VII

A composition was prepared containing 100 parts of polyvinyl chloride, 25 parts of dioctyl phthalate, 50 parts of N-butyl o-toluenesulfonamide, and 2.5 parts of copper 8-quinolinolate and processed in the above described manner. The molded specimen evidenced no signs of incompatibility.

Example VIII

A composition was prepared containing 100 parts of polyvinyl chloride, 100 parts of dioctyl phthalate, and 1.5 parts of copper 8-quinolinolate and processed in the manner described above. The molded specimen exhibited crystallization on the surface indicating the incompatibility of copper 8-quinolinolate.

Example IX

A composition comprising 100 parts of polyvinyl chloride, 100 parts of dioctyl phthalate, 30 parts of N-2-ethylhexyl p-toluenesulfonamide and 1.5 parts of copper 8-quinolinolate was processed in the above described manner. The molded specimen exhibited no signs of incompatibility.

Example X

A composition comprising 100 parts of polyvinyl chloride, 12.5 parts of dioctyl phthalate, 12.5 parts of butyl acetyl ricinoleate, and 2 parts of copper 8-quinolinolate was processed in the above described manner. The molded specimen evidenced blooming and crystallization on the surface of the composition thereby indicating the incompatibility of copper 8-quinolinolate in this composition.

Example XI

A composition comprising 100 parts of polyvinyl chloride, 12.5 parts of dioctyl phthalate, 12.5 parts of butyl acetyl ricinoleate, 35 parts of N-hexyl benzenesulfonamide, and 2 parts of copper 8-quinolinolate was processed in the above described manner. The molded specimen exhibited no signs of incompatibility.

Example XII

A composition comprising 100 parts of a polymerized vinyl resin containing 90 parts of combined vinyl chloride and 10 parts of combined vinyl acetate, 25 parts of tricresyl phosphate, 25 parts of butyl acetyl ricinoleate, and 1 part of copper 8-quinolinolate was processed in the above described manner. The molded specimen exhibited crystallization on the surface of the composition thereby indicating the incompatibility of copper 8-quinolinolate.

Example XIII

A composition comprising 100 parts of a polymerized vinyl resin containing 90 parts of combined vinyl chloride and 10 parts of combined vinyl acetate, 25 parts of tricresyl phosphate, 25 parts of butyl acetyl ricinoleate, 25 parts of N-isopropyl benzenesulfonamide, and 1 part of copper 8-quinolinolate was processed in the above described manner. The molded specimen evidenced no signs of incompatibility.

The composition described in Example XIII was calendered onto a cotton fabric. The coated fabric was thereby rendered resistant to attack by such micro-organisms as fungi and bacteria and at the same time possessed all the desirable characteristics of the base fabric and the polyvinyl chloride coating.

Example XIV

A composition comprising 100 parts of a polymerized vinyl resin containing 90 parts of combined vinyl chloride and 10 parts of combined vinyl acetate, 25 parts of tricresyl phosphate, 25 parts of butyl acetyl ricinoleate, 25 parts of N-isopropyl p-toluenesulfonamide, and 1 part of copper 8-quinolinolate was processed in the above described manner. The molded specimen evidenced no signs of incompatibility.

Examples I, III, VI, VIII, X, and XII as herein set forth very clearly indicate the extreme incompatibility of copper 8-quinolinolate in polyvinyl chloride compositions as are prepared according to the methods heretofore practiced. Examples II, VI, V, VII, IX, XI, XIII, and XIV are indicative of the outstanding compatibility effect of the N-alkyl benzenesulfonamides and the N-alkyl toluenesulfonamides of this invention on copper 8-quinolinolate in polyvinyl chloride compositions thereby permitting the formulation of polyvinyl chloride compositions which are resistant to deterioration due to attack by such micro-organisms as fungi and bacteria.

Samples of the polyvinyl chloride coated cotton fabric prepared in Examples V and XIII, and unsupported polyvinyl chloride films prepared from the compositions set forth in Examples II and XIV were inoculated with each of the following organisms:

*Chaetomium globosum*, *Metarrhizium sp.*, *Aspergillus niger* and *Penicillium sp.* and then incubated for 36 hours.

Results of this biological test were as follows:

| Organism | Fungus Activity on the Sample |
| --- | --- |
| Chaetomium globosum | No growth of the organism on the sample. |
| Metarrhizium sp. | Do. |
| Aspergillus niger | Do. |
| Penicillium sp. | Do. |

A further unsupported polyvinyl chloride film was prepared containing 100 parts of polyvinyl chloride and 50 parts of butyl acetyl ricinoleate. When this composition was inoculated with the above mentioned organisms, a severe growth of the organism took place on the sample, indicating the outstanding fungi and bacteria resistant characteristics of the novel compositions of this invention.

I claim:

1. A composition comprising 100 parts by weight of a polymerized vinyl resin containing at least 80% of combined vinyl chloride, a plasticizer for said resin, 0.1 to 2.5 parts by weight of copper 8-quinolinolate, and 5 to 50 parts by weight of a compound selected from the group consisting of N-alkyl benzenesulfonamides and N-alkyl toluenesulfonamides wherein the alkyl substituent contains at least 1 and not more than 8 carbon atoms.

2. A composition comprising 100 parts by weight of a polymerized vinyl resin containing at least 80% of combined vinyl chloride, a plasticizer for said resin, 0.1 to 2.5 parts by weight of copper 8-quinolinolate, and 10 to 30 parts by weight of a compound selected from the group consisting of N-alkyl benzenesulfonamides and N-alkyl toluenesulfonamides wherein the alkyl substituent contains at least 1 and not more than 8 carbon atoms.

3. A composition comprising 100 parts by weight of a polymerized vinyl resin containing at least 80% of combined vinyl chloride, a plasticizer for said resin, 0.1 to 2.5 parts by weight of copper 8-quinolinolate and 10 to 30 parts by weight of N-ethyl p-toluenesulfonamide.

4. A composition comprising 100 parts by weight of a polymerized vinyl resin containing at least 80% of combined vinyl chloride, a plasticizer for said resin, 0.1 to 2.5 parts by weight of copper 8-quinolinolate, and 10 to 30 parts by weight of N-isopropyl benzenesulfonamide.

5. A composition comprising 100 parts by weight of a polymerized vinyl resin containing at least 80% of combined vinyl chloride, a plasticizer for said resin, 0.1 to 2.5 parts by weight of copper 8-quinolinolate, and 10 to 30 parts by weight of N-isopropyl p-toluenesulfonamide.

6. An article of manufacture comprising a textile coated with the composition of claim 1.

7. An article of manufacture comprising a textile coated with the composition of claim 2.

8. An article of manufacture comprising a textile coated with the composition of claim 3.

9. An article of manufacture comprising a textile coated with the composition of claim 4.

10. An article of manufacture comprising a textile coated with the composition of claim 5.

WALTER E. FIELD.

REFERENCES CITED

The following references are of record in the file of this patent:

UNITED STATES PATENTS

| Number | Name | Date |
| --- | --- | --- |
| 1,903,319 | Gray | Apr. 4, 1933 |
| 2,279,771 | Austin | Apr. 14, 1942 |
| 2,288,152 | Bjorksten | June 30, 1942 |
| 2,457,025 | Benignus | Dec. 21, 1948 |
| 2,490,100 | Smith | Dec. 6, 1949 |

OTHER REFERENCES

Paint Mfg., Jan. 1948, 18, 1, pp. 21 and 22.

---

Certificate of Correction

Patent No. 2,567,905 September 11, 1951

WALTER E. FIELD

It is hereby certified that error appears in the printed specification of the above numbered patent requiring correction as follows:

Column 6, line 40, for "VI" read *IV*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*

I claim:
1. A composition comprising 100 parts by weight of a polymerized vinyl resin containing at least 80% of combined vinyl chloride, a plasticizer for said resin, 0.1 to 2.5 parts by weight of copper 8-quinolinolate, and 5 to 50 parts by weight of a compound selected from the group consisting of N-alkyl benzenesulfonamides and N-alkyl toluenesulfonamides wherein the alkyl substituent contains at least 1 and not more than 8 carbon atoms.

2. A composition comprising 100 parts by weight of a polymerized vinyl resin containing at least 80% of combined vinyl chloride, a plasticizer for said resin, 0.1 to 2.5 parts by weight of copper 8-quinolinolate, and 10 to 30 parts by weight of a compound selected from the group consisting of N-alkyl benzenesulfonamides and N-alkyl toluenesulfonamides wherein the alkyl substituent contains at least 1 and not more than 8 carbon atoms.

3. A composition comprising 100 parts by weight of a polymerized vinyl resin containing at least 80% of combined vinyl chloride, a plasticizer for said resin, 0.1 to 2.5 parts by weight of copper 8-quinolinolate and 10 to 30 parts by weight of N-ethyl p-toluenesulfonamide.

4. A composition comprising 100 parts by weight of a polymerized vinyl resin containing at least 80% of combined vinyl chloride, a plasticizer for said resin, 0.1 to 2.5 parts by weight of copper 8-quinolinolate, and 10 to 30 parts by weight of N-isopropyl benzenesulfonamide.

5. A composition comprising 100 parts by weight of a polymerized vinyl resin containing at least 80% of combined vinyl chloride, a plasticizer for said resin, 0.1 to 2.5 parts by weight of copper 8-quinolinolate, and 10 to 30 parts by weight of N-isopropyl p-toluenesulfonamide.

6. An article of manufacture comprising a textile coated with the composition of claim 1.
7. An article of manufacture comprising a textile coated with the composition of claim 2.
8. An article of manufacture comprising a textile coated with the composition of claim 3.
9. An article of manufacture comprising a textile coated with the composition of claim 4.
10. An article of manufacture comprising a textile coated with the composition of claim 5.

WALTER E. FIELD.

REFERENCES CITED

The following references are of record in the file of this patent:

UNITED STATES PATENTS

| Number | Name | Date |
| --- | --- | --- |
| 1,903,319 | Gray | Apr. 4, 1933 |
| 2,279,771 | Austin | Apr. 14, 1942 |
| 2,288,152 | Bjorksten | June 30, 1942 |
| 2,457,025 | Benignus | Dec. 21, 1948 |
| 2,490,100 | Smith | Dec. 6, 1949 |

OTHER REFERENCES

Paint Mfg., Jan. 1948, 18, 1, pp. 21 and 22.

---

Certificate of Correction

Patent No. 2,567,905

September 11, 1951

WALTER E. FIELD

It is hereby certified that error appears in the printed specification of the above numbered patent requiring correction as follows:

Column 6, line 40, for "VI" read *IV*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*

Certificate of Correction

Patent No. 2,567,905 September 11, 1951

WALTER E. FIELD

It is hereby certified that error appears in the printed specification of the above numbered patent requiring correction as follows:

Column 6, line 40, for "VI" read *IV*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*